United States Patent
Kobayashi et al.

(10) Patent No.: US 6,818,690 B1
(45) Date of Patent: Nov. 16, 2004

(54) PROPYLENE/ETHYLENE BLOCK COPOLYMER COMPOSITION FOR EXTERIOR AUTOMOTIVE PART

(75) Inventors: Yutaka Kobayashi, Chiba-ken (JP); Kenji Tanaka, Chiba-ken (JP); Yoshihisa Saeki, Saitama-ken (JP)

(73) Assignees: Idemitsu Petrochemical Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/701,376

(22) PCT Filed: Mar. 29, 2000

(86) PCT No.: PCT/JP00/01949

§ 371 (c)(1),
(2), (4) Date: Nov. 30, 2000

(87) PCT Pub. No.: WO00/60004

PCT Pub. Date: Oct. 12, 2000

(30) Foreign Application Priority Data

Mar. 31, 1999 (JP) .......................... 11/091644

(51) Int. Cl.⁷ ............................. C08K 5/52; C08L 53/00
(52) U.S. Cl. ........................ 524/327; 524/141; 524/505
(58) Field of Search ................... 524/324, 327, 524/505, 140, 141, 147, 148, 151

(56) References Cited

U.S. PATENT DOCUMENTS

| | | | |
|---|---|---|---|
| 4,164,427 A | | 8/1979 | Godfrey |
| 4,565,844 A | | 1/1986 | Kasahara et al. |
| 4,596,833 A | * | 6/1986 | Endo et al. .................... 521/60 |
| 4,621,114 A | * | 11/1986 | Watanabe .................... 524/451 |
| 5,302,653 A | * | 4/1994 | Nishio et al. ................ 524/451 |
| 5,362,782 A | | 11/1994 | McCullough, Jr. et al. |
| 5,484,824 A | * | 1/1996 | Abe et al. .................... 523/436 |
| 5,543,454 A | * | 8/1996 | Kamakura et al. .......... 524/451 |
| 5,684,099 A | * | 11/1997 | Watanabe et al. ........... 526/135 |
| 6,011,102 A | * | 1/2000 | Shimojo et al. ............. 524/451 |
| 6,034,165 A | * | 3/2000 | Tomomatsu et al. ........ 524/451 |
| 6,201,090 B1 | * | 3/2001 | Sumitomo et al. .......... 526/348 |
| 6,204,328 B1 | * | 3/2001 | Sanpei et al. ................. 525/89 |
| 6,204,336 B1 | * | 3/2001 | Hirakawa et al. ........... 525/244 |

FOREIGN PATENT DOCUMENTS

| | | | |
|---|---|---|---|
| EP | 0 265 075 | | 4/1988 |
| EP | 280297 | * | 8/1988 |
| EP | 699711 | * | 3/1996 |
| EP | 0 711 808 | | 5/1996 |
| EP | 0 953 602 | | 11/1999 |
| JP | 09183873 | * | 7/1997 |
| JP | 09183874 | * | 7/1997 |
| JP | 09227735 | * | 9/1997 |

OTHER PUBLICATIONS

English Translation of JP 09183873 (1997).*
English Translation of JP 09183874 (1997).*
English Translation of JP 09227735 (1997).*

* cited by examiner

*Primary Examiner*—Callie Shosho
(74) *Attorney, Agent, or Firm*—Oblon, Spivak, McClelland, Maier & Neustadt, P.C.

(57) ABSTRACT

A propylene-ethylene block copolymer composition having sufficient stiffness and mechanical strength required for the automobile exterior arts can be produced at low cost since no additional steps for blending other rubber components are required. The composition contains methylenebis(2,4-di-t-butylphenol) acid sodium phosphate which is blended with the propylene-ethylene block copolymer in an amount of 300 to 2,000 ppm and has (a) a melt flow rate of 10 to 18 g/10 min when measured at 230° C. under a load of 2.16 kg (21.2N); (b) an ordinary temperature xylene insoluble having a stereoregularity index fraction of 98.9% or higher when measured by $^{13}$C-NMR; and (c) an ordinary temperature xylene soluble having a content of 22 to 28% by weight has a single component with respect to a relaxation time T1 measured by pulse NMR and satisfies the following formula (I):

$$y \leq 0.0014x^3 - 0.0897x^2 - 1.0593x + 231.6 \qquad (I)$$

where x is an ethylene content (% by weight) measured by $^{13}$C-NMR and y is the relaxation time T1 (msec) measured by pulse NMR.

15 Claims, No Drawings

PROPYLENE/ETHYLENE BLOCK COPOLYMER COMPOSITION FOR EXTERIOR AUTOMOTIVE PART

TECHNICAL FIELD

The present invention relates to a propylene-ethylene block copolymer composition for use in automobile exterior parts such as bumper fascias, splash shields and side moldings, and more particularly to a propylene-ethylene block copolymer composition having a sufficient mechanical strength required for automobile exterior parts, which is produced at a low cost without additional steps for blending other rubber components or the like.

BACKGROUND ARTS

Hitherto, automobile exterior parts such as bumper fascias, splash shields and side moldings have been produced from polypropylene-based composite materials prepared by blending polypropylene with other components such as rubbers and talc. However, the production of these composite materials requires additional steps for blending the other components such as rubbers and talc with the polypropylene. For this reason, there has been increasing demand for developing a composition capable of being molded into automobile exterior parts by itself without blending other components, and many attempts have been made.

For example, Chikashi Okayama, "Chemical Economy", pp. 8–15 (October, 1996) discloses a gas-phase polymerization process for producing a polypropylene block copolymer in which the solid structure of the product is micro-controlled by carrying out the polymerization in the presence of a specific catalyst. However, the resultant composition, which contains no inorganic materials and has a specific gravity of 0.89 or less, is unsatisfactory in stiffness and mechanical strength required for automobile exterior parts since the flexural modulus is as lows as 700 MPa and the −30° C. Izod impact strength is as low as 120 kJ/m$^2$ at most.

DISCLOSURE OF THE INVENTION

The present invention has been made to solve the above problems. An object of the present invention is to provide a propylene-ethylene block copolymer composition for automobile exterior parts, which has sufficient stiffness and mechanical strength required for the automobile exterior parts and is produced at low cost without additional steps for blending other components such as rubbers.

As a result of extensive researches in view of the above object, the inventors have found that the object is accomplished by blending a limited amount of a nucleating agent comprising methylenebis(2,4-di-t-butylphenol) acid sodium phosphate with a propylene-ethylene block copolymer upon granulation thereof to produce a composition having specific structure and properties. The present invention has been completed based on this finding.

Namely, the propylene-ethylene block copolymer composition of the present invention is a composition for use in producing automobile exterior parts, comprising a propylene-ethylene block copolymer and a nucleating agent comprising methylenebis(2,4-di-t-butylphenol) acid sodium phosphate which is blended with the propylene-ethylene block copolymer in an amount of 300 to 2,000 ppm upon granulation thereof, and having (a) a melt flow rate (MFR) of 10 to 18 g/10 min when measured at 230° C. under a load of 2.16 kg (21.2N); (b) an ordinary temperature xylene insoluble having a stereoregularity index [mmmm] fraction of 98.9% or higher when measured by $^{13}$C-NMR; and (c) an ordinary temperature xylene soluble characterized by: (c-1) having a content of 22 to 28% by weight; (c-2) comprising only a single component with respect to a relaxation time T1 measured by pulse NMR; and (c-3) satisfying the following formula (I):

$$y \leq 0.0014x^3 - 0.0897x^2 - 1.0593x + 231.6 \qquad (I)$$

wherein x is an ethylene content (% by weight) measured by $^{13}$C-NMR and y is the relaxation time T1 (msec) measured by pulse NMR.

The propylene-ethylene block copolymer composition of the present invention has (d) a flexural modulus of 1,000 to 1,500 MPa; (e) a −30° C. Izod impact strength of 6 to 8 kJ/m$^2$; and (f) a tensile elongation of 200% or higher.

The propylene-ethylene block copolymer composition of the present invention is suitably used for the production of automobile exterior parts such as bumper fascias, splash shields and side moldings.

PREFERRED EMBODIMENT TO CARRY OUT THE INVENTION

The propylene-ethylene block copolymer composition of the present invention comprises a polypropylene part, a propylene-ethylene copolymer part and a polyethylene part, and (a) contains 300 to 2000 ppm of methylenebis(2,4-di-t-butylphenol) acid sodium phosphate (NA11) as a nucleating agent which is added when the propylene-ethylene block copolymer produced in the form of powder is granulated. When the addition amount is less than 300 ppm, automobile exterior parts molded from the composition are insufficient in stress such as flexural modulus. The addition of the nucleating agent more than 2,000 ppm produces no improvement in stiffness.

The propylene-ethylene block copolymer composition of the present invention has a melt flow rate (MFR) of 10 to 18 g/10 min, preferably 12 to 16 g/10 min when measured at 230° C. under a load of 2.16 kg (21.2N). When the melt flow rate of the composition is less than 10 g/10 min, the composition is difficult to be molded due to its insufficient fluidity. When the melt flow rate is more than 18 g/10 min, the resultant molded products are insufficient in mechanical strength such as tensile elongation.

The propylene-ethylene block copolymer composition of the present invention contains (b) an ordinary temperature xylene insoluble having a stereoregularity index [mmmm] fraction of 98.9% or higher when measured by $^{13}$C-NMR.

The ordinary temperature xylene insoluble substantially comprises the propylene homopolymer part. The stereoregularity index [mmmm] fraction, referred to also as an isotactic pentad fraction, means a percentage of the number of meso-bonded pentad sequences of propylene monomer units to the total number of propylene monomer units present in polypropylene molecular chain. Therefore, a polypropylene becomes highly isotactic with increasing isotactic pentad fraction. When the stereoregularity index [mmmm] fraction is less than 98.9%, the composition is insufficient in stiffness such as flexural modulus.

The propylene-ethylene block copolymer composition of the present invention contains (c1) an ordinary temperature xylene soluble in an amount of 22 to 28% by weight.

The ordinary temperature xylene soluble substantially comprises the ethylene-propylene copolymer part, and contains no crystalline polyethylene. When the content of the xylene soluble is less than 22% by weight, the composition is unsatisfactory in low-temperature impact resistance. When the content of the xylene soluble is more than 28% by weight, the composition is unsatisfactory in stiffness such as flexural modulus and deteriorated in surface hardness and heat resistance.

The ordinary temperature xylene soluble (c2) comprises only a single component with respect to the relaxation time T1 measured by pulse NMR, and (c3) satisfying the following formula (I):

$$y \leq 0.0014x^3 - 0.0897x^2 - 1.0593x + 231.6 \quad (I)$$

wherein x is an ethylene content (% by weight) measured by $^{13}$C-NMR and y is the relaxation time T1 (msec) measured by pulse NMR.

When an electromagnetic radiation pulse of a specific frequency is applied to the ordinary temperature xylene soluble, the nuclear magnetic moment of the specimen is excited and then returns to the initial state. The time taken to return to the initial state is called as the relaxation time T1. The relaxation time T1 measured by pulse NMR indicates a magnitude of molecular motion of the specimen. A short relaxation time T1 of the specimen corresponds to a low frequency range of the molecular motion. The fact that a specimen having a short relaxation time T1 exhibits a high impact resistance suggests that the time scale for the impact test is close to the above frequency range.

Also, the fact that the xylene soluble contains only a single component with respect to the relaxation time T1 means that the xylene soluble shows properties close to those of a uniform component. That is, the satisfaction of the formula (I) shows that the ethylene-propylene copolymer part, irrespective of its inclusion of ethylene, is low in frequency range of molecular motion and constituted by a rubber-like elastomer which substantially comprises a single component.

The relaxation time T1 of the ordinary temperature xylene soluble is determined by pulse NMR as described below.

Based on the results of pulse NMR measurement, the values of $\ln\{M(\infty)-M(0)\}$ are plotted as a function of the variable time $\tau$ (irradiation interval between 180° pulse and 90° pulse) taking the intensity of signals after applying 90° pulse as $M(\tau)$. The plots produce a line which slopes down toward the right, and the relaxation time T1 is given by the absolute value of the reciprocal of the slope. A steeper slope of the line means a smaller relaxation time T1 and immediate decay in shorter period of time. If plots produce various lines with different slopes, it means that the xylene soluble comprises a plurality of components with respect to the relaxation time T1. Therefore, in order that the xylene soluble comprises only a single component with respect to the relaxation time T1, the plots are required to form a single line.

The propylene-ethylene block copolymer composition of the present invention is deteriorated in impact strength if the ordinary temperature xylene soluble fails to comprise only a single component with respect to the relaxation time T1 measured by pulse NMR. Further, if the formula (I) is not satisfied, the composition is also deteriorated in impact strength.

The propylene-ethylene block copolymer composition of the present invention is required to have (d) a flexural modulus of 1,000 to 1,500 MPa, (e) a −30° C. Izod impact strength of 6 to 8 kJ/m$^2$, and (f) a tensile elongation of 200% or higher.

When the flexural modulus is less than 1,000 MPa, the composition is too soft to retain the shapes of the automobile exterior parts. When the flexural modulus is more than 1,500 MPa, the composition is deteriorated in low-temperature impact resistance. When the −30° C. Izod impact strength is less than 6 kJ/m$^2$, the composition is poor in impact resistance, so that the resultant automobile exterior parts tend to be broken upon collision. When the −30° C. Izod impact strength is more than 8 kJ/m$^2$, the flexural modulus of the composition is reduced. When the tensile elongation of the composition is less than 200%, the resultant automobile exterior parts tend to be broken upon collision.

As described above, since a nucleating agent comprising methylenebis(2,4-di-t-butylphenol) acid sodium phosphate is blended in a limited amount, the propylene-ethylene block copolymer composition of the present invention satisfies the above requirements (a) to (f), i.e., the composition is highly balanced between stiffness such as flexural modulus and mechanical strength such as impact strength. Therefore, the composition of the present invention is suitably applied to the automobile exterior parts without adding other rubber components or the like.

[Production of Propylene-ethylene Block Copolymer Composition]

The propylene-ethylene block copolymer composition of the present invention may be produced by any suitable methods without particular limitations as long as the obtained composition satisfies the above requirements. In order to produce a polymer containing a high-stereoregular propylene homopolymer and having an excellent copolymerizability with ethylene especially in a high molecular weight corresponding to MFR of about 12 to 16 g/10 min, the use of Ziegler catalysts rather than metallocene catalysts is preferred. More specifically, the polymerization may be carried out in the presence of, for example, a catalyst comprising (A) a solid catalyst component composed of (a) a titanium compound, (b) a magnesium compound, (c) an electron donor and, if required, (d) a silicon compound; (B) an organoaluminum compound; and (C) an electron donating compound as a third component. In particular, the solid catalyst component usable in the present invention may be produced by contacting the magnesium compound and the titanium compound at 120 to 150° C. in the presence of the electron donating compound and, if required, the silicon compound, and then rinsing the contacted product with an inert solvent at 100 to 150° C.

In the present invention, the obtained polymer may be subjected to post-treatments by ordinary methods. Specifically, in the gas-phase polymerization, a nitrogen stream may be passed through a powdery polymer taken out of a polymerization vessel to remove propylene, ethylene, etc. in the powdery polymer. Alternatively, the obtained polymer may be pelletized using an extruder, if desired. Upon the extrusion, a slight amount of water, alcohol or the like may be added to the polymer to completely deactivate the remaining catalyst. In the bulk polymerization, the polymer taken out of a polymerization vessel may be pelletized after completely removing remaining monomers.

Upon the pelletization, methylenebis(2,4-di-t-butylphenol) acid sodium phosphate as the nucleating agent is added to the obtained polymer in an amount of 300 to 2,000 ppm.

The present invention will be described in more detail with reference to the following examples, but these examples are not intended to limit the present invention thereto.

The analysis of structure and the measurement of properties of the propylene-ethylene block copolymer composition were conducted by the following methods.

(1) Melt Flow Rate (MFR)

Measured at 230° C. under a load of 2.16 kg (21.2N) according to JIS K7210.

(2) Ordinary Temperature Xylene Soluble and Xylene Insoluble

The ordinary temperature (25° C.) xylene soluble and xylene insoluble were obtained as follows.

(a) Into a 1,000-ml round bottom flask, an accurately weighed sample (5±0.05 g) was charged. After charging 1±0.05 g of BHT (antioxidant), 700±10 ml of p-xylene and a rotor were placed in the flask.

(b) After fitting a condenser to the round bottom flask, the flask was heated for 120±30 minutes in an oil bath maintained at 140±5° C. under stirring, thereby dissolving the sample into p-xylene.

(c) The contents of the flask were poured into a 1,000-ml beaker. The solution in the beaker was allowed to stand (for 8 hours or longer) under agitating by a stirrer until the solution was cooled to room temperature (25° C.). Thereafter, the solution was filtered though a wire mesh to remove the precipitates.

(d) The filtrate was filtered through a filter paper and then poured into 2,000±100 ml of methanol in a 3,000-ml beaker. The resultant mixture was allowed to stand at room temperature (25° C.) for 2 hours or more while stirring with a stirrer.

(e) Thereafter, the precipitates were separated by filtration through a wire mesh, air-dried for 5 hours or more and then vacuum-dried at 100±5° C. for 240 to 270 minutes in a vacuum dryer to recover a 25° C. xylene soluble.

(f) The precipitates separated by filtration through the wire mesh in the step (c) were re-dissolved in p-xylene in the same manner as in the steps (a) and (b). The still hot solution was rapidly poured into 2,000±100 ml of methanol in a 3,000-ml beaker, agitated by a stirrer for 2 hours or more, and then allowed to stand at room temperature (25° C.) over night.

(g) Thereafter, the precipitates were separated by filtration though a wire mesh, air-dried for 5 hours or more and then vacuum-dried at 100±5° C. for 240 to 270 minutes in a vacuum dryer to recover a 25° C. xylene insoluble.

The content (w) of the 25° C. xylene soluble is represented by the formula:

$$w\ (\%\ \text{by weight}) = 100 \times C/A$$

wherein A is a weight (g) of the sample and C is a weight (g) of the xylene soluble recovered in the step (e). The content of the xylene insoluble is represented by (100−w) % by weight.

(3) Ethylene Content of Ordinary Temperature Xylene Soluble Measured by $^{13}$C- NMR In an NMR sample tube, 220 mg of a sample were placed and then 3 ml of a mixed solvent of 1,2,4-trichlorobenzene/heavy benzene (90/10 by volume) were added. After sealing the tube with a cap, the sample was dissolved in the solvent at 130° C., and the resultant uniform solution was subjected to $^{13}$C-NMR under the following conditions.

Apparatus used: JNM-EX400 manufactured by Nihon Denshi Co., Ltd.

Pulse width: 9 μs (45°)
Pulse interval: 4 seconds
Spectrum width: 20,000 Hz
Measuring temperature: 130° C.
Number of integration: 1,000 to 10,000

The ethylene unit content (z) of the 25° C. xylene soluble and the ethylene unit content (y) of the 25° C. xylene insoluble were determined by the following methods.

The triad sequence fractions (mol%) of ethylene (E) and propylene (P) were calculated from the following formulae, using the intensities of seven peaks present in a region of 35 to 21 ppm (chemical shift from tetramethylsilane (TMS) standard) of a $^{13}$C-NMR spectrum of the sample.

$$f_{EPE} = [K(T\delta\delta)/T] \times 100$$

$$f_{PPE} = [K(T\beta\delta)/T] \times 100$$

$$f_{EEE} = [K(S\gamma\delta)/4T + K(S\delta\delta)/2T] \times 100$$

$$f_{PPP} = [K(T\beta\beta)/T] \times 100$$

$$f_{PEE} = [K(S\beta\delta)/T] \times 100$$

$$f_{PEP} = [K(S\beta\beta)/T] \times 100$$

wherein $T = K(T\delta\delta) + K(T\beta\delta) + K(S\gamma\delta)/4 + K(S\delta\delta)/2 + K(T\beta\beta) + K(S\beta\delta) + K(S\beta\beta)$.

In the above formulae, for example, $f_{EPE}$ is EPE triad sequence fraction (mol%), and $K(T\delta\delta)$ is an integrated intensity of the peaks assigned to $T\delta\delta$ carbon.

The ethylene unit content (% by weight) is calculated from the following formula using the above triad sequence fractions.

$$\text{Ethylene unit content (\% by weight)} = 28\{3f_{EEE} + 2(f_{PEE} + f_{EPE}) + f_{PPE} + F_{PEP}\} \times 100/[28\{3f_{EEE} + 2(f_{PEE} + f_{EPE}) + f_{PPE} + f_{PEP}\} + 42\{3f_{PPP} + 2(f_{PPE} + f_{PEP}) + f_{EPE} + f_{PEE}\}]$$

(4) Stereoregularity Index of Ordinary Temperature Xylene Insoluble Measured by $^{13}$C-NMR In a $^{13}$C-NMR spectrum of the 25° C. xylene insoluble, the signal of methyl carbon is observed as nine split peaks of mmmm, mmmr, rmmr, mmrr, mmrm+rrmr, rmrm, rrrr, mrrr and mrrm over a wide range from low magnetic field to high magnetic field due to the influence of streoregurality. Of these nine peaks, the six peaks with higher intensities, i.e., mmmm, mmmr, mmrr, mmrm+rrmr, rrrr and mrrm are used to calculate the stereoregularity index of the xylene insoluble according to the following formula:

$$\text{Stereoregularity index (\%)} = L_{mmmm} \times 100/(L_{mmmm} + L_{mmmr} + L_{mmrr} + L_{mmrm+rrmr} + L_{rrrr} + L_{mrrm})$$

wherein $L_{mmmm}, L_{mmmr}, L_{mmrr}, L_{mmrm+rrmr}, L_{rrrr}$ and $L_{mrrm}$ represent peak heights from the base line of mmmm, mmmr, mmrr, mmrm+rrmr, rrrr and mrrm peaks of a $^{13}$C-NMR spectrum.

Since, the peak of mmmm is constituted by a plurality of discrete points having different chemical shifts and different peak heights, and the peak of mmmr appears on the tailing of the main peak of mmmm, the heights of these peaks from the base line are corrected by ordinary methods.

(5) Relaxation time T1 of Ordinary Temperature Xylene Soluble Measured by Pulse NMR The relaxation time T1 is a time constant of a longitudinal magnetization recovery, and is determined most generally by an inversion recovery method (180°−τ−90° pulse method). When θ=180° pulse is applied to a sample at the time t=0, the magnetization in the −z'-axis direction is generated, and then the magnetization begins to return to thermal equilibrium value $M_0$. After the elapse of time τ, when 90° pulse is applied, the magnetization is rotated to the y'-axis direction to create FID signals in proportion to the magnitude of magnetization. By continuously changing τ, a recovery curve of signal intensity M(τ) is obtained. According to Bloch equation, the longitudinal magnetization recov ery under the initial condition of $M(0)=-M_0$ is expressed by the following formula:

$$M=M_0\{1-2exp(-\tau/T1)\}$$

Further, in practice, using the relationship of $\ln\{M(\infty)-M(\tau)\}=\ln\{2M(\infty)\}-\tau/T1$, the relaxation time T1 is determined from the slope of line obtained by plotting $\ln\{M(\infty)-M(\tau)\}$ vs. $\tau$.

Meanwhile, upon conducting a series of measurements including repeated tests for integration, the subsequent series of application of pulse should be delayed until the magnetization fully returns to thermal equilibrium state. Since the delay time was at least 5T1 (99.3% return for the period of 5T1), the value $M(\tau)$ satisfying $\tau>5T1$ was adopted as $M(\infty)$.

The relaxation time T1 was measured using a pulse NMR apparatus CXP-90 manufactured by Bruker Co., Ltd. under the following conditions:
Measuring nucleus: hydrogen nucleus
Measuring frequency: 90 MHz
Measuring temperature: 30° C.
Measuring method: Inversion recovery method (180°–τ–90° pulse method)
180°: 180° pulse
90°: 90° pulse
τ: variable time
90° pulse width: 2.3 to 2.4 μsec
(6) Flexural Modulus
Measured according to ASTM D790.
(7) Izod Impact Strength
Measured according to ASTM D256 at –30° C. using a notched injection-molded piece.
(8) Tensile Elongation
Measured according to ASTM D638.
[Preparation of Polymerization Catalyst]
(1) Preparation of Catalyst A
(Preparation of Solid Catalyst Component)

A five-liter three-necked flask equipped with a stirrer which had been purged with nitrogen, was charged with 160 g of diethoxy magnesium and further with 600 ml of dehydrated octane. The contents of the flask were heated to 40° C. and then mixed with 24 ml of silicon tetrachloride. The resultant mixture was stirred for 20 minutes, and mixed with 16 ml of dibutyl phthalate. The obtained solution was heated to 80° C., followed by the dropwise addition of 770 ml of titanium tetrachloride through a funnel. The contact of the reactants was carried out at an internal temperature of 125° C. for 2 hours. Then, the stirring was stopped to allow the solid product to sediment, and a supernatant was discarded. After mixed with 100 ml of dehydrated octane, the solid product was heated to 125° C. under stirring and maintained at that temperature for one minute. Then the stirring was stopped to allow the solid product to sediment, and a supernatant was discarded. The above washing procedure was repeated seven times. The solid product was further contacted with 1,220 ml of titanium tetrachloride at an inner temperature of 125° C. for 2 hours. Then, the solid product were further washed with dehydrated octane of 125° C. six times to obtain a solid catalyst component.
(Pre-polymerization)

An one-liter three-necked flask equipped with a stirrer which had been purged with nitrogen, was charged with 48 g of the solid catalyst component and then with 400 ml of dehydrated heptane. The contents of the flask were heated to 40° C. and then added with 2.0 ml of triethylaluminum and 6.3 ml of dicyclopentyldimethoxysilane. The reaction was conducted by passing propylene gas through the resultant mixture under ordinary pressure for 2 hours. Thereafter, the solid component was thoroughly washed with dehydrated heptane to obtain a catalyst A.

(2) Preparation of Catalyst B
(Preparation of Solid Catalyst Component)

A five-liter three-necked flask equipped with a stirrer which had been purged with nitrogen, was charged with 160 g of diethoxy magnesium and further with 600 ml of dehydrated heptane. The contents of the flask were heated to 40° C. and then mixed with 24 ml of silicon tetrachloride. The resultant mixture was stirred for 20 minutes, and added with 25 ml of dibutyl phthalate. The obtained solution was heated to 80° C., followed by the dropwise addition of 770 ml of titanium tetrachloride through a funnel. The contact of the reactants was carried out at an internal temperature of 110° C. for 2 hours. Then, the solid product was washed with dehydrated heptane of 90° C. seven times, and then contacted with 1,220 ml of titanium tetrachloride at an inner temperature of 110°C. for 2 hours. Then, the solid product was further washed with dehydrated heptane of 60° C. six times to obtain a solid catalyst component.
(Pre-polymerization)

An one-liter three-necked flask equipped with a stirrer which had been purged with nitrogen, was charged with 48 g of the solid catalyst component and then with 400 ml of dehydrated heptane. The contents of the flask were heated to 40° C. and then added with 2.0 ml of triethylaluminum and 6.3 ml of dicyclopentyldimethoxysilane. The reaction was conducted by passing propylene gas through the resultant mixture under ordinary pressure for 2 hours. Thereafter, the solid component was thoroughly washed with dehydrated heptane to obtain a catalyst B.

(3) Preparation of Catalyst C
(Preparation of Solid Catalyst Component)

A five-liter three-necked flask equipped with a stirrer which had been purged with nitrogen, was charged with 160 g of diethoxy magnesium and further with 600 ml of dehydrated heptane. The contents of the flask were heated to 40° C. and then mixed with 24 ml of silicon tetrachloride. The resultant mixture was stirred for 20 minutes, and added with 23 ml of diethyl phthalate. The obtained solution was heated to 80° C., followed by the dropwise addition of 770 ml of titanium tetrachloride through a funnel. The contact of the reactants was carried out at an internal temperature of 110°C. for 2 hours. Then, the solid product was washed with dehydrated heptane of 90° C. seven times, and then contacted with 1,220 ml of titanium tetrachloride at an inner temperature of 110° C. for 2 hours. Then, the solid product was further washed with dehydrated heptane of 90° C. six times to obtain a solid catalyst component.
(Pre-polymerization)

An one-liter three-necked flask equipped with a stirrer which had been purged with nitrogen, was charged with 48 g of the solid catalyst component and then with 400 ml of dehydrated heptane. The contents of the flask were added with 2.7 ml of triethylaluminum and 2 ml of cyclohexylmethyldimethoxysilane, while kept at 10° C. The reaction was conducted by passing propylene gas through the resultant mixture under ordinary pressure for 2 hours. Thereafter, the solid component was thoroughly washed with dehydrated heptane to obtain a catalyst C.

EXAMPLE 1

A five-liter stainless-steel autoclave equipped with a stirrer was sufficiently dried with nitrogen and then purged with propylene gas. While keeping the autoclave at 70°C., the inner pressure of the autoclave was increased to 0.05 MPa by introducing propylene gas. Then, hydrogen gas was introduced into the autoclave until the inner pressure of the autoclave reached 0.7 MPa, and then the inner pressure was gradually increased to 2.8 MPa by introducing propylene gas. Then, 20 ml of heptane, 4 mmol of triethyl aluminum, 1 mmol of dicyclopentyldimethoxysilane and 0.02 mmol of the catalyst A were placed in a 60-ml catalyst feed pipe which had been purged with a nitrogen gas and the mixture was added into the autoclave where the polymerization was conducted for 60 minutes to produce a propylene homopolymer. Then, a mixed gas of ethylene/propylene in a molar ratio of 3.5:6.5 was introduced into the autoclave until the inner pressure reached 0.12 MPa. While keeping at 70° C. under 1 MPa, propylene-ethylene copolymerization was conducted for 45 minutes. Thereafter, the autoclave was evacuated to atmospheric pressure and the inner temperature of the autoclave was decreased to ordinary temperature. Then, the autoclave was opened to recover a resultant polymer powder.

The obtained polymer powder was intimately mixed with 1,000 ppm of calcium stearate as a neutralizing agent, 500 ppm of DHT-4A (magnesium-aluminum-hydroxide-carbonate-hydrate produced by Kyowa Kagaku Kogyo Co., Ltd.), 750 ppm of P-EPQ as an antioxidant (tetrakis(2,4di-tert-butylphenyl-4,4-bisphenylenediphosphonite) produced by Asahi Denka Kogyo Co., Ltd.), 1,500 ppm of INGA-NOX1010 (phenol-based antioxidant produced by Ciba Speciality Chemicals Co., Ltd.) and 1,200 ppm of NA11 as a nucleating agent (methylenebis(2,4-di-t-butylphenol) acid sodium phosphate produced by Asahi Denka Kogyo Co., Ltd.). The resultant mixture was melt-kneaded and granulated using a 20mmϕ single screw extruder, thereby obtaining pellets of a propylene-ethylene block copolymer composition. A part of the pellets was subjected to the structural analysis, and the remainder of the pellets was injection-molded to prepare various test pieces which were then subjected to measurement of the physical properties. The results are shown in Table 1.

EXAMPLE 2

Pellets of propylene-ethylene block copolymer composition were produced by the same method as in Example 1 except that the propylene-ethylene copolymerization was conducted for 60 minutes and the amount of the nucleating agent NA11 was changed to 2,000 ppm. The structural analysis and measurements of physical properties were carried out by the same method as in Example 1. The results are shown in Table 1.

EXAMPLE 3

Pellets of propylene-ethylene block copolymer composition were produced by the same method as in Example 1 except that the molar ratio of ethylene/propylene was changed to 4.5:5.5. The structural analysis and measurements of physical properties were carried out by the same method as in Example 1. The results are shown in Table 1.

EXAMPLE 4

Pellets of propylene-ethylene block copolymer composition were produced by the same method as in Example 1 except that the molar ratio of ethylene/propylene was changed to 5.5:4.5, and the amount of the nucleating agent NA11 was changed to 800 ppm. The structural analysis and measurements of physical properties were carried out by the same method as in Example 1. The results are shown in Table 1.

EXAMPLE 5

Pellets of propylene-ethylene block copolymer composition were produced by the same method as in Example 1 except that the ethylene/propylene mixed gas was introduced until the inner pressure of the autoclave reached 0.9 MPa. The structural analysis and measurements of physical properties were carried out by the same method as in Example 1. The results are shown in Table 1.

Comparative Example 1

Pellets of propylene-ethylene block copolymer composition were produced by the same method as in Example 2 except that cyclohexylmethyldimethoxysilane was used instead of dicyclopentyldimethoxysilane, the catalyst C was used instead of the catalyst A, and the use of the nucleating agent NA11 was omitted. The structural analysis and measurements of physical properties were carried out by the same method as in Example 1. The results are shown in Table 2.

Comparative Example 2

Pellets of propylene-ethylene block copolymer composition were produced by the same method as in Example 2 except that cyclohexylmethyldimethoxysilane was used instead of dicyclopentyldimethoxysilane, and the catalyst C was used instead of the catalyst A. The structural analysis and measurements of physical properties were carried out by the same method as in Example 1. The results are shown in Table 2.

Comparative Example 3

Pellets of propylene-ethylene block copolymer composition were prepared by the same method as in Example 2 except that hydrogen gas was introduced into the autoclave until the inner pressure reached 0.55 MPa, the catalyst B was used instead of the catalyst A, a mixed gas of ethylene/propylene (molar ratio: 1:2) was introduced into the autoclave until the inner pressure reached 0.1 MPa, and the use of the nucleating agent NA11 was omitted. The structural analysis and measurements of physical properties were carried out by the same method as in Example 1. The results are shown in Table 2.

Comparative Example 4

Pellets of propylene-ethylene block copolymer composition were prepared by the same method as in Example 2 except that the mixed gas of ethylene/propylene was introduced into the autoclave until the inner pressure reached 0.15 MPa, the propylene-ethylene copolymerization was conducted for 80 minutes; and the use of the nucleating agent NA11 was omitted. The structural analysis and measurements of physical properties were carried out by the same method as in Example 1. The results are shown in Table 2.

TABLE 1

|  | Examples | | | | |
| --- | --- | --- | --- | --- | --- |
|  | 1 | 2 | 3 | 4 | 5 |
| Amount of nucleating agent (ppm) | 1,200 | 2,000 | 1,200 | 800 | 1,200 |
| MFR (g/10 min) | 12.7 | 12.0 | 12.8 | 11.4 | 10.5 |
| Stereoregularity index of ordinary temperature xylene insoluble (%) | 99.1 | 99.1 | 99.1 | 99.0 | 99.1 |
| Content of ordinary temperature xylene soluble (wt. %) | 22.0 | 25.1 | 22.1 | 25.7 | 22.0 |
| Relaxation time (T1) y (msec) | 146 | 147 | 140 | 134 | 146 |
| Value of right side of formula (I) | 149.2 | 149.5 | 140.2 | 136.2 | 149.2 |
| Flexural modulus (MPa) | 1,150 | 1,150 | 1,180 | 1,050 | 1,180 |
| −30° C. Izod impact strength (kJ/m$^2$) | 6.5 | 7.2 | 6.6 | 8.0 | 7.1 |
| Tensile elongation (%) | ≧500 | 250 | 200 | 300 | ≧500 |

TABLE 2

|  | Comparative Examples | | | |
| --- | --- | --- | --- | --- |
|  | 1 | 2 | 3 | 4 |
| Amount of nucleating agent (ppm) | 0 | 2,000 | 0 | 0 |
| MFR (g/20 min) | 12.0 | 12.0 | 8.1 | 1.2 |
| Stereoregularity index of ordinary temperature xylene insoluble (%) | 96.3 | 98.9 | 99.1 | 99.0 |
| Content of ordinary temperature xylene soluble (wt. %) | 25.1 | 25.0 | 15.4 | 34.2 |
| Relaxation time (T1) y (msec) | 193 | 193 | 133 | 143 |
| Value of right side of formula (I) | 175.2 | 175.2 | 132.3 | 139.9 |
| Flexural modulus (MPa) | 760 | 1,150 | 1,150 | 600 |
| −30° C. Izod impact strength (kJ/m$^2$) | 3.3 | 3.2 | 4.8 | 91.0 |
| Tensile elongation (%) | ≧500 | 180 | ≧500 | ≧500 |

INDUSTRIAL APPLICABILITY

The propylene-ethylene block copolymer composition of the present invention is produced at low cost since no additional steps for blending other rubber components are required in the production thereof, and exhibits sufficient stiffness and mechanical strength such as flexural modulus, Izod impact strength and tensile elongation required in automobile exterior parts.

What is claimed is:

1. A propylene-ethylene block copolymer composition for automobile exterior parts, comprising a propylene-ethylene block copolymer having a melt flow rate (MFR) of 12 to 16 g/10 min and a nucleating agent comprising methylenebis (2,4-di-t-butylphenol) acid sodium phosphate, said nucleating agent blended with the propylene-ethylene block copolymer in an amount of 300 to 2,000 ppm when the propylene-ethylene block copolymer is granulated, and said composition having:

(a) a melt flow rate (MFR) of 10 to 18 g/10 min when measured at 230° C. under a load of 2.16 kg (21.2N);

(b) a 25° C. xylene insoluble having a stereoregularity index [mmmm] fraction of 98.9% or higher when measured by C$^{13}$-NMR; and (c) a 25° C. xylene soluble wherein the xylene soluble:

(c-1) is present in an amount of 22 to 28% by weight based on the propylene-ethylene block copolymer;

(c-2) comprises only a single component with respect to a relaxation time T1 measured by pulse NMR; and (c-3) satisfies the following formula (1):

$$y \leq 0.0014x^3 - 0.0897x^2 - 1.0593x + 231.6 \quad (I)$$

wherein x is an ethylene content (% by weight) measured by $^{13}$C-NMR and y is the relaxation time T1 (msec) measured by pulse NMR.

2. The propylene-ethylene block copolymer composition according to claim 1, wherein said composition has (d) a flexural modulus of 1,000 to 1,500 MPa; (e) a −30° C. Izod impact strength of 6 to 8 kJ/m$^2$; and (f) a tensile elongation of 200% or higher.

3. The propylene-ethylene block copolymer composition according to claim 1, wherein said automobile exterior parts include bumper fascias, splash shields and side moldings.

4. The composition according to claim 1, wherein the 25° C. xylene soluble is present in an amount of from 25.1 to 28%.

5. The composition according to claim 1, wherein the 25° C. xylene soluble is present in an amount of from 25.7 to 28%.

6. A propylene-ethylene block copolymer composition for automobile exterior parts, consisting essentially of a propylene-ethylene block copolymer having a melt flow rate (MFR) of 12 to 16 g/10 min and a nucleating agent consisting essentially of methylenebis(2,4di-t-butylphenol) acid sodium phosphate, said nucleating agent blended with the propylene-ethylene block copolymer in an amount of 300 to 2,000 ppm when the propylene-ethylene block copolymer is granulated, said composition having:

(a) a melt flow rate (MFR) of 10 to 18 g/10 min when measured at 230° C. under a load of 2.16 kg (21.2N);

(b) a 25° C. xylene insoluble having a stereoregularity index [mmmm] fraction of 98.9% or higher when measured by C$^{13}$-NMR; and (c) a 25° C. xylene soluble characterized by:

(c-1) having a content of 22 to 28% by weight based on the composition;

(c-2) comprising only a single component with respect to a relaxation time T1 measured by pulse NMR; and (c-3) satisfying the following formula (I):

$$y \leq 0.0014x^3 - 0.0897x^2 - 1.0593x + 231.6 \quad (I)$$

wherein x is an ethylene content (% by weight) measured by $^{13}$C-NMR and y is the relaxation time T1 (msec) measured by pulse NMR.

7. The propylene-ethylene block copolymer composition according to claim 6, wherein said composition has (d) a flexural modulus of 1,000 to 1,500 MPa; (e) a −30° C. Izod impact strength of 6 to 8 kJ/m$^2$; and (f) a tensile elongation of 200% or higher.

8. The propylene-ethylene block copolymer composition according to claim 6, wherein said automobile exterior parts include bumper fascias, splash shields and side moldings.

9. The composition according to claim 6, wherein the 25° C. xylene soluble has a content of from 25.1 to 28%.

10. The composition according to claim 6, wherein the 25° C. xylene soluble has a content of from 25.7 to 28%.

11. A composition comprising a propylene-ethylene block copolymer having a melt flow rate of 12 to 16 g/10 min and a nucleating agent comprising methylenebis(2,4-di-t-butylphenol) acid sodium phosphate, wherein said nucleating agent is present in an amount of 300 to 2,000 ppm, said composition having:

(a) a melt flow rate of 10 to 18 g/10 min when measured at 230° C. under a load of 2.16 kg (21.2N);

(b) a 25° C. xylene insoluble having a stereoregularity index [mmmm] fraction of 98.9% or higher when measured by $C^{13}$-NMR; and (c) a 25° C. xylene soluble content of 22 to 28% by weight based on the composition; wherein said xylene soluble comprises a single component with respect to a relaxation time T1 measured by pulse NMR; and satisfies the following formula (I):

$$y \leq 0.0014x^3 - 0.0897x^2 - 1.0593x + 231.6 \qquad (I)$$

wherein x is an ethylene content (% by weight) measured by $^{13}$C-NMR and y is the relaxation time T1 (msec) measured by pulse NMR.

12. The composition according to claim 11, wherein said composition has (d) a flexural modulus of 1,000 to 1,500 MPa;

(e) a −30° Izod impact strength of 6 to 8 kJ/m$^2$; and (f) a tensile elongation of 200% or higher.

13. The composition according to claim 11, wherein the nucleating agent is blended with the propylene-ethylene block copolymer when the propylene-ethylene block copolymer is granulated.

14. The composition according to claim 11, wherein the 25° C. xylene soluble has a content of from 25.1 to 28%.

15. The composition according to claim 11, wherein the 25° C. xylene soluble has a content of from 25.7 to 28%.

* * * * *